(12) United States Patent
Tavakoli-Targhi et al.

(10) Patent No.: US 9,598,123 B1
(45) Date of Patent: Mar. 21, 2017

(54) HYBRID SPARE TIRE RECEPTACLE FOR A VEHICLE

(71) Applicant: Dura Operating, LLC, Auburn Hills, MI (US)

(72) Inventors: Ali Tavakoli-Targhi, Rochester Hills, MI (US); Alex Mark Langreet, Mount Clemens, MI (US); Jamie Zinser, Royal Oak, MI (US)

(73) Assignee: Dura Operating, LLC, Auburn Hills, MI (US)

( * ) Notice: Subject to any disclaimer, the term of this patent is extended or adjusted under 35 U.S.C. 154(b) by 0 days.

(21) Appl. No.: 14/921,300

(22) Filed: Oct. 23, 2015

(51) Int. Cl.
| B62D 25/20 | (2006.01) |
| B62D 43/10 | (2006.01) |
| B62D 27/02 | (2006.01) |

(52) U.S. Cl.
CPC ........... B62D 43/10 (2013.01); B62D 27/026 (2013.01)

(58) Field of Classification Search
CPC ......... B62D 43/00; B62D 43/06; B62D 43/10
USPC ................................................ 296/37.2, 37.3
See application file for complete search history.

(56) References Cited

U.S. PATENT DOCUMENTS

| 5,669,534 | A | * | 9/1997 | Edgerley | ............... | B62D 43/045 |
| | | | | | | 224/42.18 |
| 5,860,687 | A | * | 1/1999 | Corporon | ............... | B62D 43/10 |
| | | | | | | 224/42.12 |
| 6,793,261 | B2 | | 9/2004 | McLeod et al. | | |
| 7,063,811 | B2 | | 6/2006 | Brozenick et al. | | |
| 2011/0227367 | A1 | * | 9/2011 | Funakoshi | ........... | B62D 25/087 |
| | | | | | | 296/187.11 |

FOREIGN PATENT DOCUMENTS

| DE | 102007044428 A1 | 3/2009 |
| DE | 102010054195 A1 | 6/2012 |

\* cited by examiner

*Primary Examiner* — Dennis H Pedder
(74) *Attorney, Agent, or Firm* — Dinsmore & Shohl LLP

(57) ABSTRACT

A spare tire receptacle for a vehicle includes a receptacle body having a recessed portion and at least one side wall that extends from the recessed portion includes a monolithically formed cross car beam formed therein. The side wall extends to a body portion. A reinforcement structure is attached to the main body. The reinforcement structure includes a plurality of reinforcement members that extend radially from a central position of the recessed portion and a plurality of rib members that interconnect the reinforcement members. The receptacle body and reinforcement structure are formed of differing materials defining a hybrid structure.

22 Claims, 7 Drawing Sheets

HYBRID SPARE TIRE RECEPTACLE FOR A VEHICLE

FIELD OF THE INVENTION

The invention relates to spare tire receptacles or tire wells for a vehicle.

BACKGROUND OF THE INVENTION

Vehicles may often include a spare tire well or receptacle in which a spare tire is stored. Often these spare tire wells are disposed in a rear of the vehicle and are attached to a floor pan of the vehicle. Typically such spare tire wells are formed of metal materials and are attached to the vehicle using mechanical fasteners, welding, bonding, and other types of connections that require complicated assembly processes. Further, such prior art spare tire receptacles or wells transmit various noises and vibrations to a vehicle that are undesirable.

There is therefore a need in the art for an improved spare tire receptacle that results in a weight reduction compared to current prior art metallic spare tire receptacles. There is also a need in the art for a spare tire receptacle that reduces the number of parts and simplifies an installation or manufacturing of a vehicle. There is also a need in the art for a spare tire receptacle for a vehicle that has improved NVH performance and provides a structural design to accommodate forces applied to the spare tire receptacle.

SUMMARY OF THE INVENTION

In one aspect, there is disclosed a spare tire receptacle for a vehicle that includes a receptacle body having a recessed portion and at least one side wall that extends from the recessed portion. The side wall extends to a body portion. A reinforcement structure is attached to the main body. The reinforcement structure includes a plurality of reinforcement members that extend radially from a central position of the recessed portion and a plurality of rib members that interconnect the reinforcement members.

In another aspect, there is disclosed a spare tire receptacle for a vehicle that includes a receptacle body having a recessed portion and at least one side wall extending from the recessed portion. The side wall extends to a body portion. A reinforcement structure is attached to the main body with mechanical interlocks. The mechanical interlocks include a plurality of apertures formed in the receptacle body. The reinforcement structure includes a plurality of mechanical interlocks monolithically formed with the reinforcement structure. The plurality of mechanical interlocks extend through the apertures and span a receptacle body thickness. The mechanical interlocks include a main body disposed proximate one side of the thickness and a head portion disposed proximate an opposing side of the thickness. A transition portion connects the main body and head portions. The reinforcement structure includes a plurality of reinforcement members that extend radially from a central position of the recessed portion and a plurality of rib members interconnecting the reinforcement members.

In yet another aspect there is disclosed a spare tire receptacle for a vehicle that includes a receptacle body having a recessed portion and at least one side wall extending from the recessed portion. The side wall extends to a body portion. The receptacle body includes a monolithically formed cross car beam formed therein. The cross car beam is typically a separate two-piece component in vehicles. However it is monolithically integrated into the spare tire receptacle or hybrid tire tub geometry. As a result, the cost and labor associated with fabrication and joining of separate cross car beams are eliminated. A reinforcement structure is attached to the main body. The reinforcement structure includes a plurality of reinforcement members extending radially from a central position of a recessed portion. A plurality of rib members interconnect the reinforcement members. The reinforcement structure extends about the at least one side wall and terminates at the body portion.

DETAILED DESCRIPTION OF THE PREFERRED EMBODIMENTS

Figure 1:
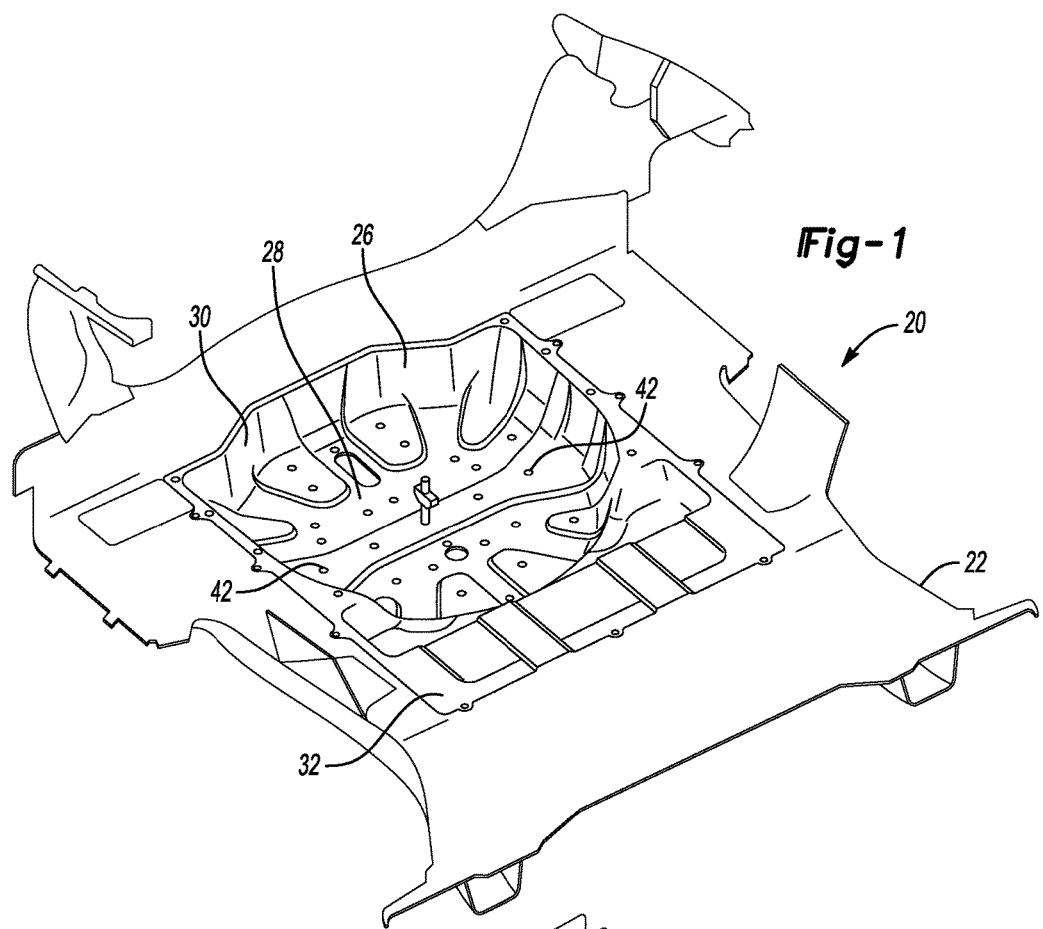
FIG. 1 is a perspective view of a spare tire receptacle attached to a vehicle body.
Figure 2:
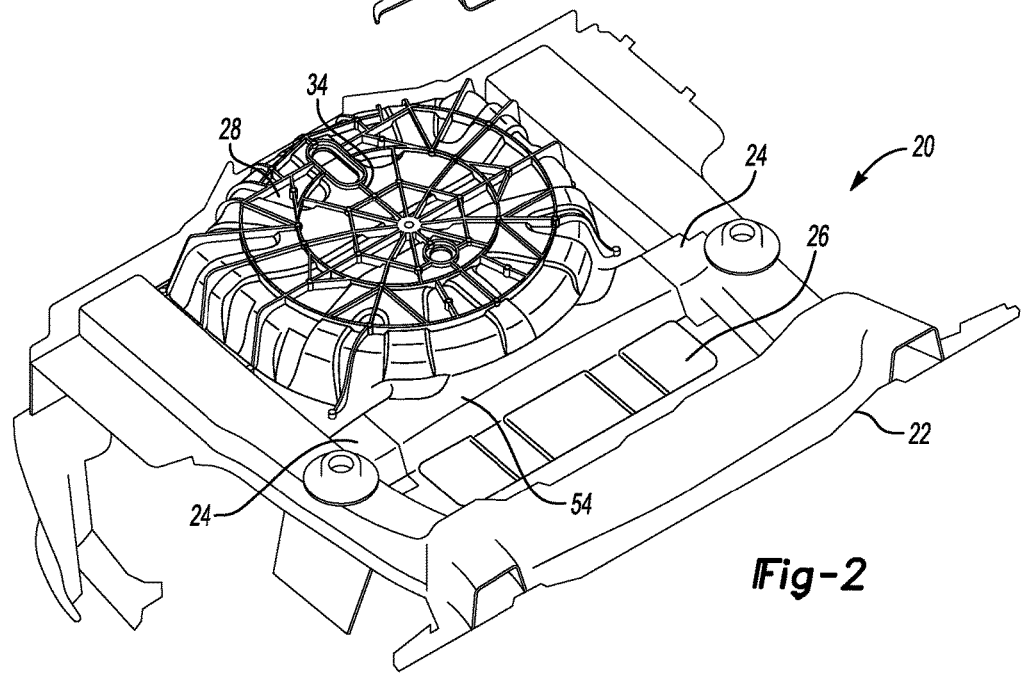
FIG. 2 is a perspective view of a spare tire receptacle attached to the vehicle body from an opposing side relative to FIG. 1.
Figure 3:
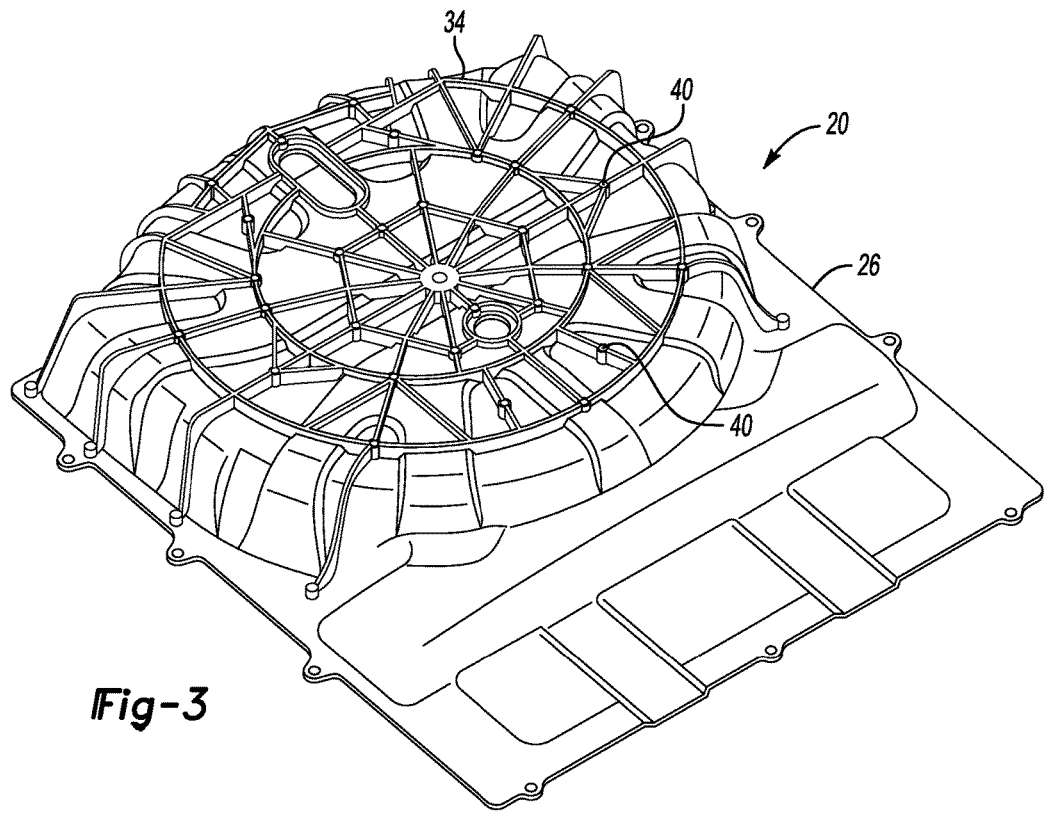
FIG. 3 is a perspective view of a spare tire receptacle including a receptacle body and reinforcement structure.
Figure 4:
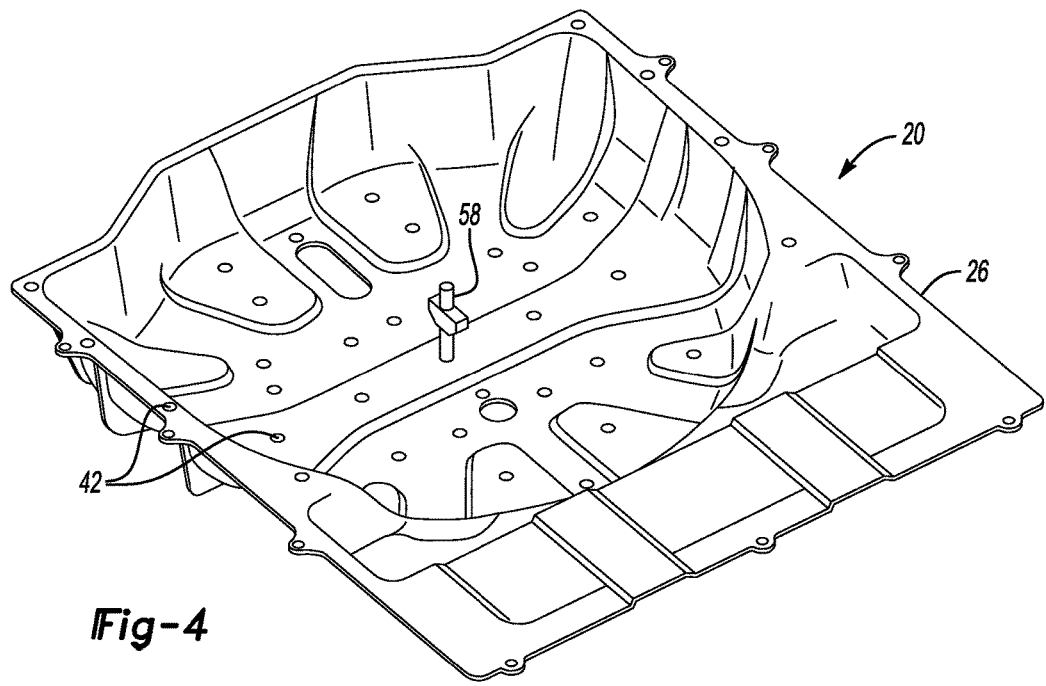
FIG. 4 is a perspective view of a spare tire receptacle including a receptacle body and reinforcement structure on an opposing side relative to FIG. 3.

Referring to FIGS. 1-4, there is shown a spare tire receptacle 20 for a vehicle. The spare tire receptacle 20 is attached to a vehicle body 22 utilizing brackets 24 that are attached to a receptacle body 26, as will be discussed in more detail below. The spare tire receptacle 20 includes a receptacle body 26 having a recessed portion 28 and at least one side wall 30 that extends from the recessed portion 28. The side wall 30 extends to a body portion 32. A reinforcement structure 34 is attached to the receptacle body 22. The reinforcement structure 34 includes a plurality of reinforcement members 36 extending radially from a central position of the recessed portion 28 with a plurality of rib members 38 interconnecting the reinforcement members 36. In one aspect, the reinforcement structure 34 resembles a web pattern. The receptacle body 26 and reinforcement structure 34 are formed of differing materials defining a hybrid structure.

The reinforcement structure 34 may be attached to the receptacle body 26 using an adhesive to bond the reinforcement structure 34 to the receptacle body 26. Alternatively, the reinforcement structure 34 may be attached to the receptacle body 26 utilizing rivets. Further, the reinforcement structure 34 may be mechanically attached to the receptacle body 26 utilizing a plurality of mechanical interlocks 40.

Figure 14:
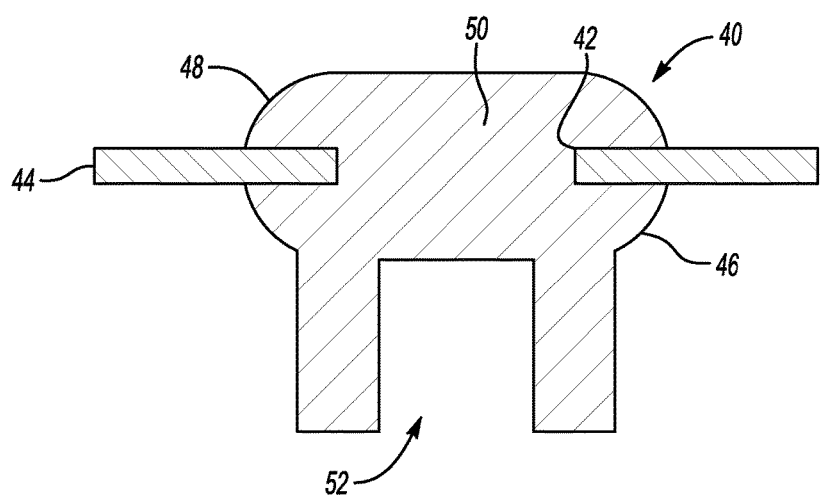
FIG. 14 is a sectional view of a mechanical interlock.

In one aspect, the mechanical interlocks 40, as best shown in FIG. 14 may include a plurality of apertures 42 formed in the receptacle body 26. The reinforcement structure 34 may include the plurality of interlocks 40 monolithically formed with the reinforcement structure 34. The plurality of mechanical interlocks 40 extend through the apertures 42 and span a receptacle body thickness 44. The mechanical interlocks 40 include a main body 46 disposed proximate one side of the thickness 44 and a head portion 48 disposed proximate an opposing side of the thickness 44. A transition portion 50 connects the main body 46 and head portion 48. In one aspect, the main body 46 may include a bore 52 formed longitudinally therein about a centerline of the aperture 42. The main body 46 and head portion 48 may include a uniform thickness. The main body 46 and head portion 48 extend radially about the aperture 42 the same distance. It should be realized that the head portion 48 and main body 46 may extend radially about the aperture 42 a differing amount.

Figure 5:
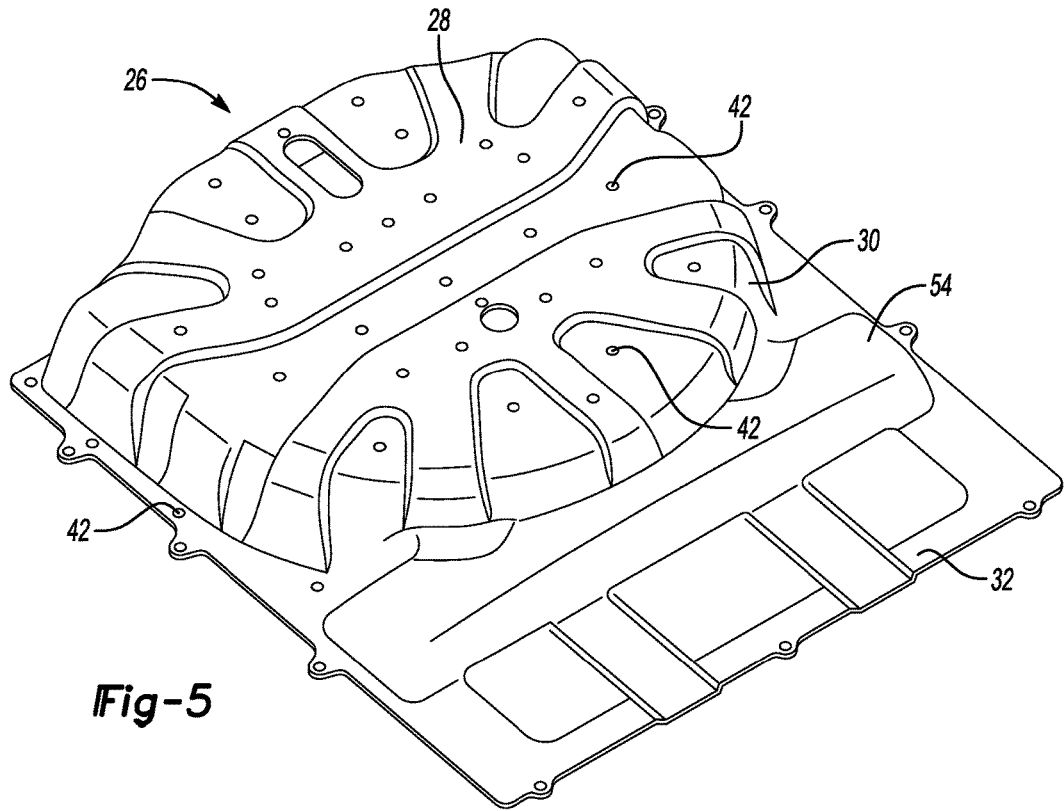
FIG. 5 is a perspective view of a receptacle body.
Figure 6:
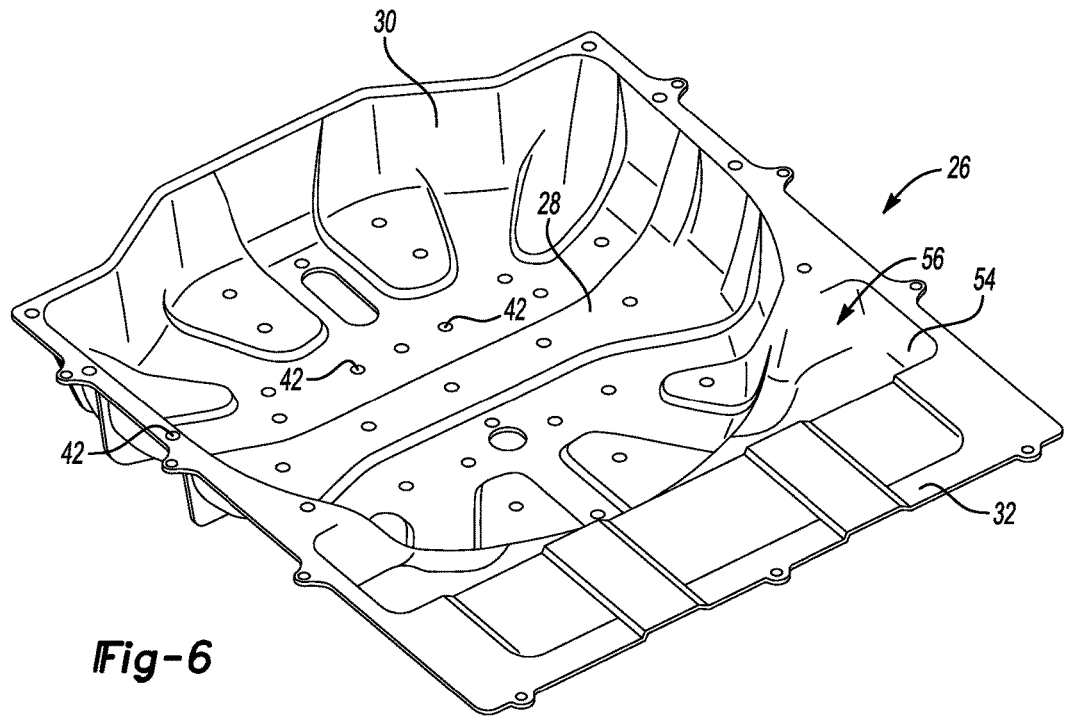
FIG. 6 is a perspective view of a receptacle body on an opposing side relative to FIG. 5.

Referring to FIGS. 5 and 6, there is depicted the receptacle body 26. In one aspect, the receptacle body 26 may be formed of a metal material such as aluminum, magnesium, or steel. In one aspect, the receptacle body 26 may be formed of a metal having a thickness of from 0.5 to 1.5 mm. In this manner, a significant weight reduction may be achieved relative to prior art metallic spare tire wells. In one aspect, the receptacle body 26 includes a monolithically formed cross car beam 54. As can be seen in the figures, the cross car beam 54 includes a channel 56 that spans a width of the receptacle body 26 defining the monolithically formed cross car beam 54. Additionally, the brackets 24 as described above and best seen in FIGS. 1 and 2 are shaped to contact the monolithic cross bar beam 54 and attach to the vehicle body 22.

Figure 7:
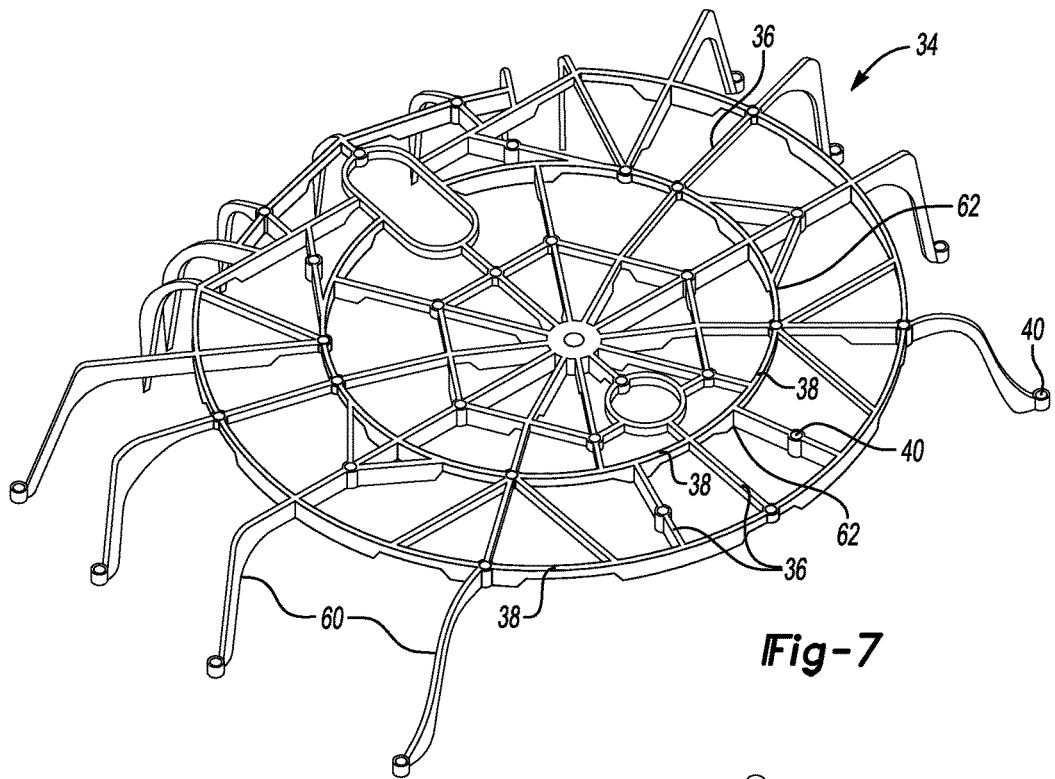
FIG. 7 is a perspective view of a reinforcement structure.
Figure 8:
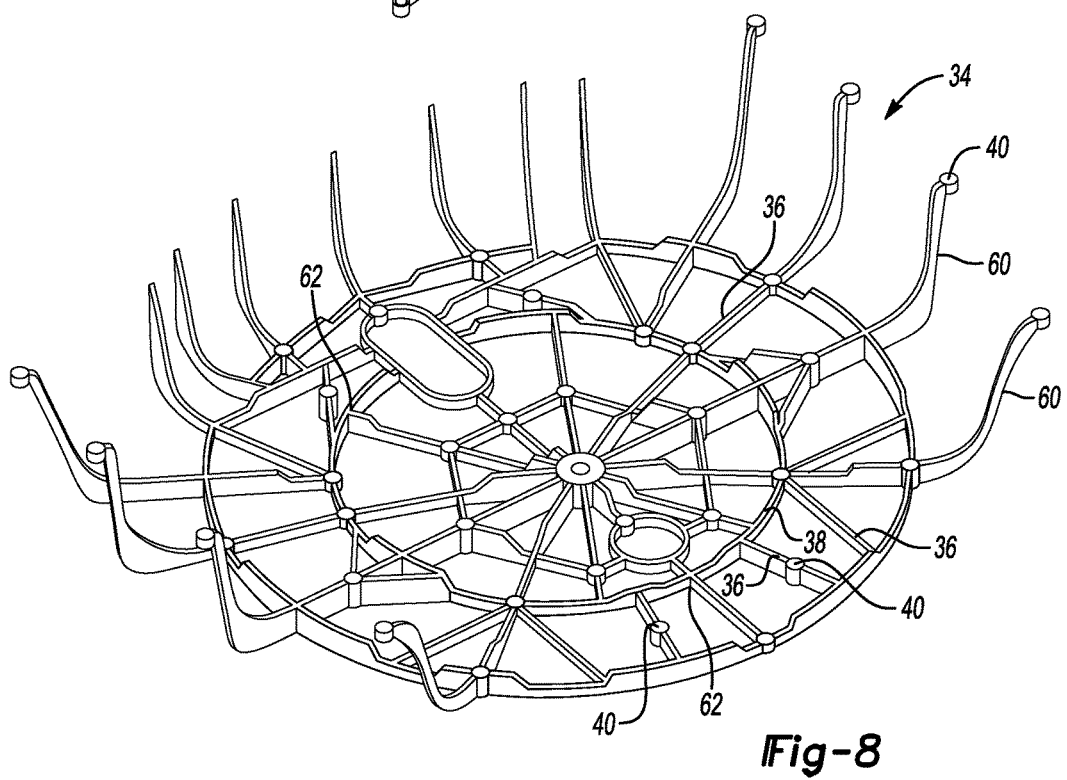
FIG. 8 is a perspective view of a reinforcement structure on an opposing side relative to FIG. 7.
Figure 9:
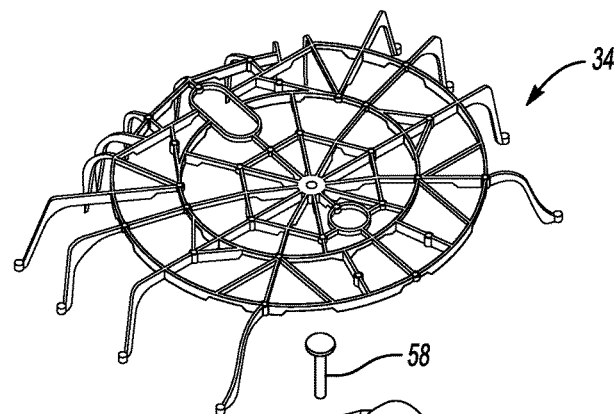
FIG. 9 is an exploded perspective view of a receptacle body, reinforcement structure, and tire hold down structure.

Referring to FIGS. 7 and 8, there is shown the reinforcement structure 34 of the spare tire receptacle 20. As described above, the reinforcement structure 34 includes a plurality of reinforcement members 36 that extend radially from a central position and a plurality of rib members 38 that interconnect the reinforcement members 36. In one aspect, the reinforcement members 36 and rib members 38 may be formed in a shape of a web that extends radially from the central portion. In one aspect, the central portion may include a tire hold down structure 58 that is attached to the receptacle body 26 by the reinforcement structure 34.

The reinforcement structure 34 includes legs 60 that extend about the at least one side wall 30 and terminate at the body portion 32 of the receptacle body 26. In one aspect, the recessed portion 28 and body portion 32 include a plurality of apertures 42 formed therein and are attached to the mechanical interlocks 40 of the reinforcement structure 34. The at least one side wall 30 may not include apertures 42 formed therein attaching interlocks 40 to the receptacle body 26.

In one aspect, the reinforcement structure 34 may be formed of a polymeric material that is over-molded onto the receptacle body 26. In one aspect, the polymeric material may be a fiber reinforced polymeric material such as but not limited to short or long glass fiber, carbon fiber, aramid fiber, Kevlar fiber and any other fiber materials that could be used to reinforce the polymeric material.

The reinforcement structure 34 stabilizes and provides structural reinforcement to the receptacle body 26 resulting in a significant weight savings in comparison to prior art spare tire wells. The plurality of reinforcement members 36 may be utilized to stiffen the spare tire receptacle 20 in a vertical or Z direction. The plurality of rib members 38 may be utilized to stiffen the spare tire receptacle 20 in a torsional or twisting force direction. Additionally, the intersections or junctions 62 where the reinforcement members 36 and rib members 38 join provide a localized stiffness to the receptacle body 26 mitigating vibration.

Figure 10:
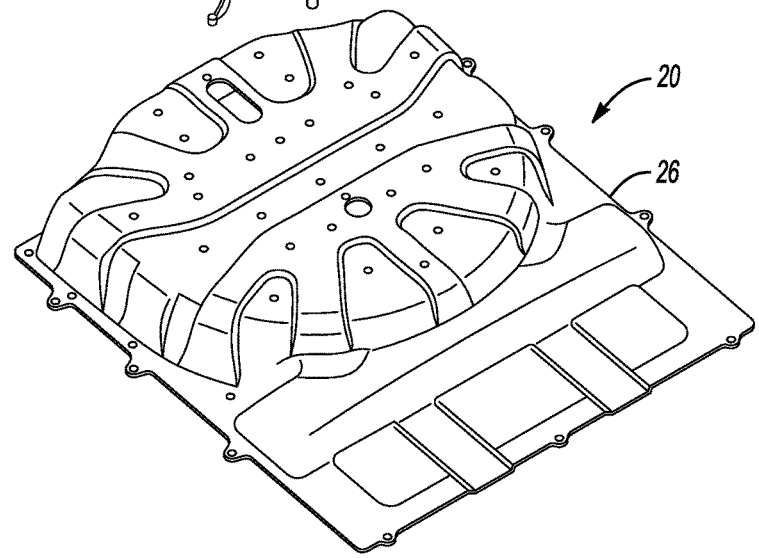
FIG. 10 is a plan view of a spare tire receptacle detailing force nodes.
Figure 10:
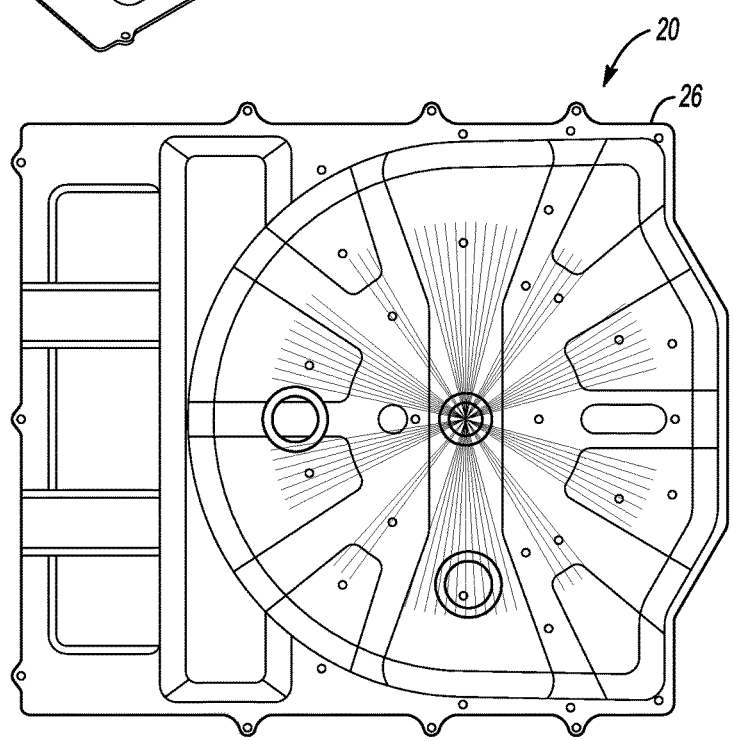
Figure 11:
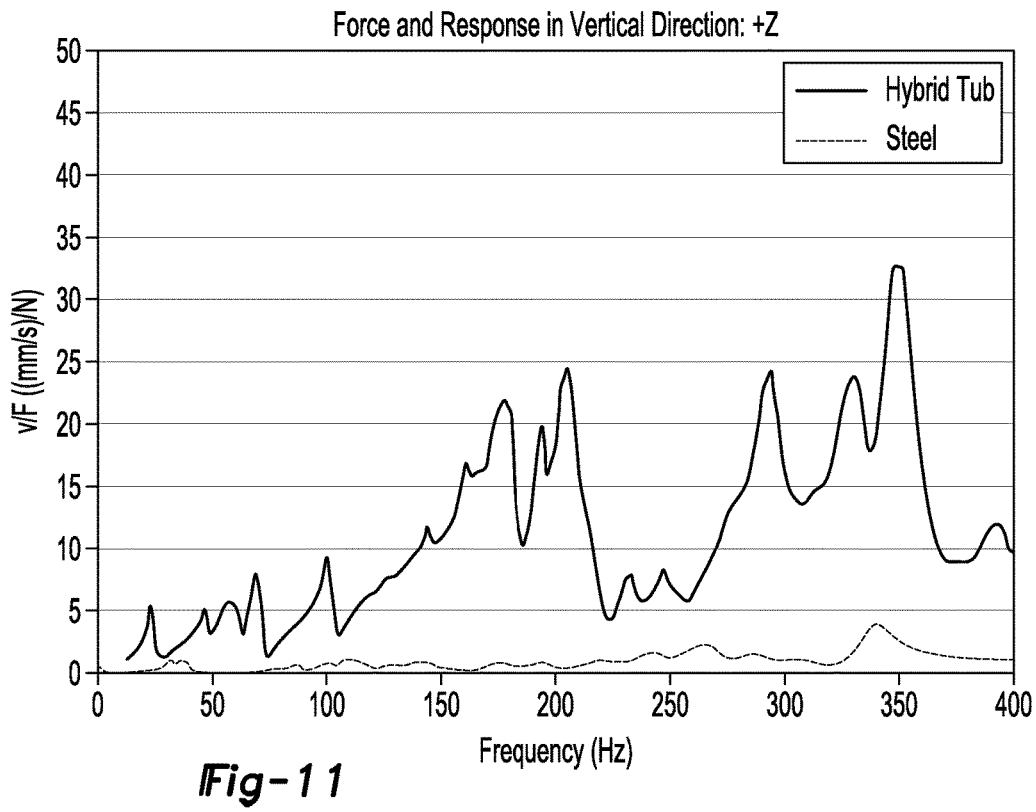
FIG. 11 is a plot of the force as a function of frequency for a spare tire receptacle of the invention in comparison to a steel spare tire prior art receptacle.
Figure 12:
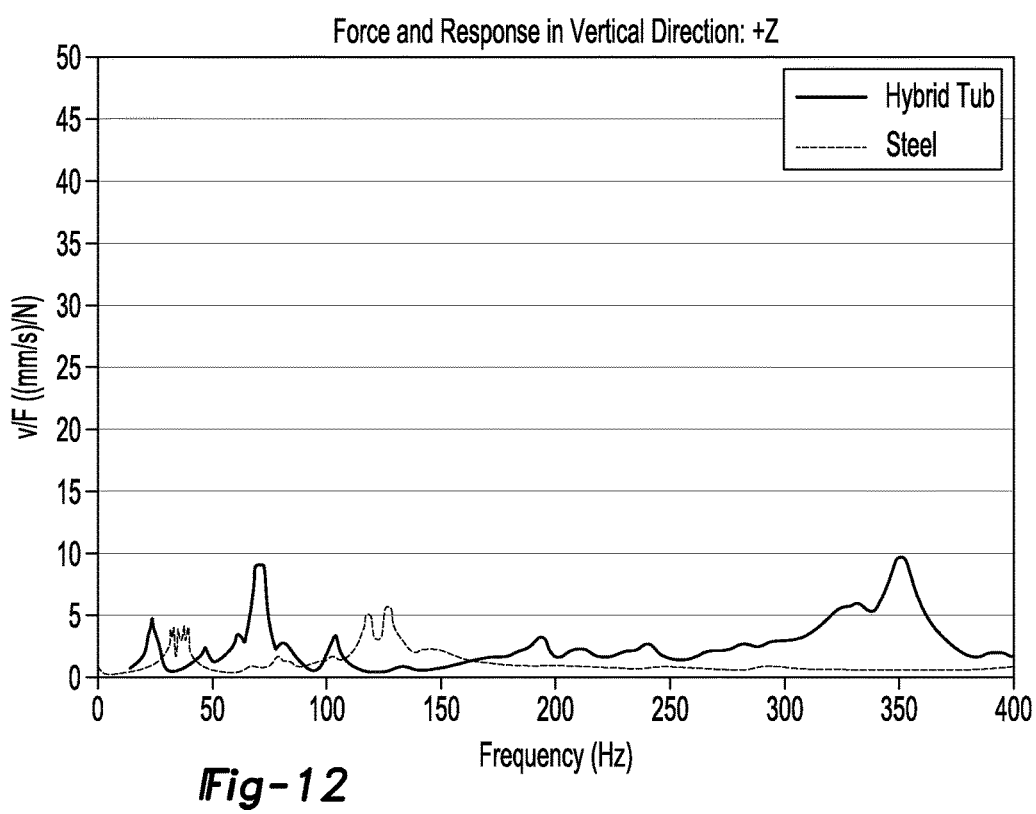
FIG. 12 is a plot of the force as a function of frequency for a spare tire receptacle of the invention in comparison to a steel spare tire prior art receptacle.
Figure 13:
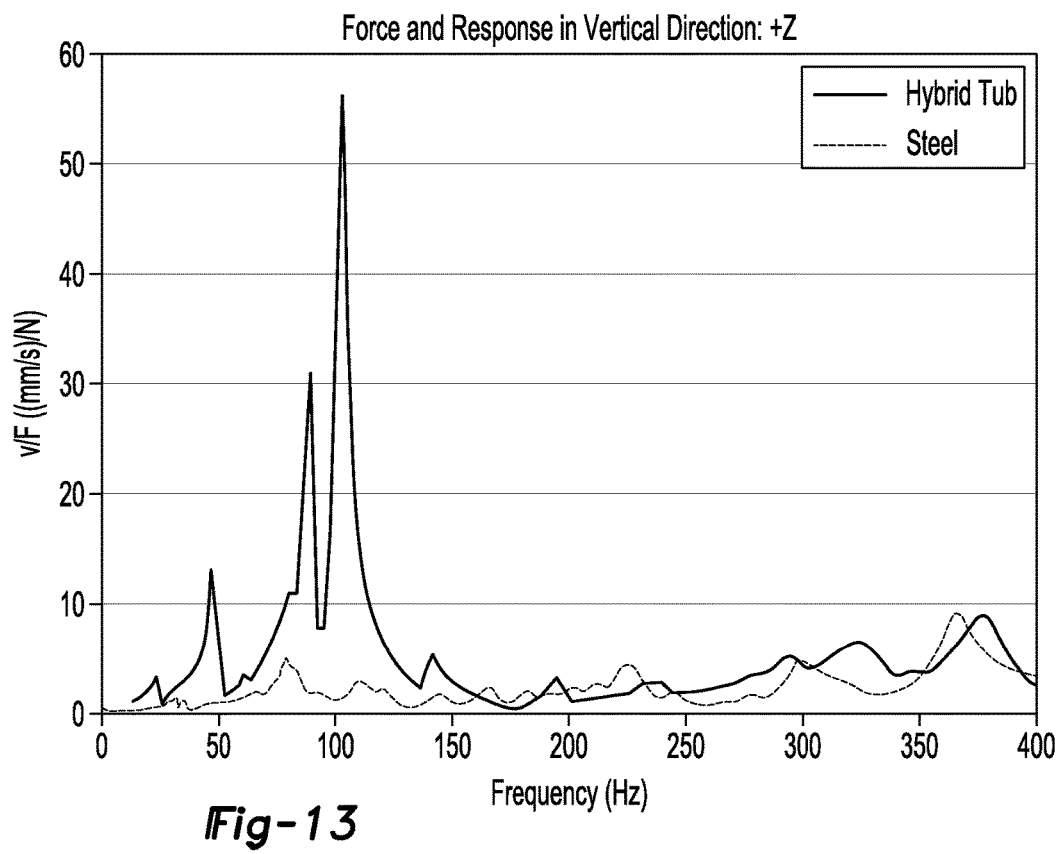
FIG. 13 is a plot of the force as a function of frequency for a spare tire receptacle of the invention in comparison to a steel spare tire prior art receptacle.

The spare tire receptacle 20 including the receptacle body 26 and reinforcement structure 34 provides a hybrid system that includes improved performance characteristics. In one aspect, the reinforcement structure eliminates matric seals that are typically used in conventional tire tubs to dampen vibrations. As a result, the hybrid tire tub can reduce weight and cost associated with mastic seals. Referring to FIG. 10, there is shown a front force node, side force node, and center node of a spare tire receptacle 20. Referring to FIG. 11, there is shown a plot of the force and response in a vertical direction or Z direction as a function of frequency for the side node. As can be seen in the figure, the hybrid spare tire receptacle 20 has significantly less frequency response than a prior art steel tire receptacle. Referring to FIG. 12, the center node also displays a significant reduction in frequency response for various force conditions. Referring to FIG. 13, the plot of force as a function of frequency for the front node also displays an improved frequency response in comparison to a prior art steel tire receptacle.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

We claim:

1. A spare tire receptacle for a vehicle comprising:
   a receptacle body including a recessed portion and at least one side wall extending from the recessed portion, the side wall extending to a body portion;
   a reinforcement structure attached to the receptacle body, the reinforcement structure including a plurality of reinforcement members extending radially from a central position of the recessed portion and a plurality of rib members interconnecting the reinforcement members wherein the receptacle body is formed of metal and the reinforcement structure is formed of a polymeric material.

2. The spare tire receptacle of claim 1 wherein the reinforcement structure is mechanically attached to the receptacle body with a plurality of mechanical interlocks.

3. The spare tire receptacle of claim 2 wherein the mechanical interlocks include a plurality of apertures formed in the receptacle body and the reinforcement structure including the plurality of mechanical interlocks monolithically formed with the reinforcement structure, the plurality of mechanical interlocks extending through the apertures and spanning a receptacle body thickness, the mechanical interlocks including a main body disposed proximate one side of the thickness and a head portion disposed proximate an opposing side of the thickness and a transition portion connecting the main body and head portion wherein the main body includes a bore formed longitudinally therein about a centerline of the aperture.

4. The spare tire receptacle of claim 3 wherein the main body and head portion includes a uniform thickness.

5. The spare tire receptacle of claim 3 wherein the main body and head portion extend radially about the aperture the same distance.

6. The spare tire receptacle of claim 1 wherein the polymeric material is a fiber reinforced polymeric material.

7. The spare tire receptacle of claim 3 wherein the bore is sized to define a uniform thickness of the head portion and the main body.

8. The spare tire receptacle of claim 1 wherein the plurality of reinforcement members stiffen the spare tire receptacle in a Z direction.

9. The spare tire receptacle of claim 1 wherein the plurality of rib members stiffen the spare tire receptacle in a torsion direction.

10. The spare tire receptacle of claim 1 wherein the reinforcement members and rib members intersect at a junction providing a localized stiffness to the receptacle body mitigating vibration.

11. The spare tire receptacle of claim 1 wherein the receptacle body includes a monolithically formed cross car beam formed therein.

12. The spare tire receptacle of claim 1 further including brackets attached to the receptacle body for attaching a vehicle body.

13. The spare tire receptacle of claim 1 further including a tire hold down structure attached to the receptacle body and the reinforcement structure.

14. The spare tire receptacle of claim 1 wherein the recessed portion and body portion includes a plurality of apertures formed therein and attached to mechanical interlocks of the reinforcement structure.

15. The spare tire receptacle of claim 1 wherein the reinforcement structure extends about the at least one side wall and terminates at the body portion.

16. A spare tire receptacle for a vehicle comprising:
a receptacle body including a recessed portion and at least one side wall extending from the recessed portion, the side wall extending to a body portion;
a reinforcement structure attached to the main body with mechanical interlocks wherein the mechanical interlocks include a plurality of aperture formed in the receptacle body and the reinforcement structure including the plurality of mechanical interlocks monolithically formed with the reinforcement structure, the plurality of mechanical interlocks extending through the apertures and spanning a receptacle body thickness, the mechanical interlocks including a main body disposed proximate one side of the thickness and a head portion disposed proximate an opposing side of the thickness and a transition portion connecting the main body and head portion, the reinforcement structure including a plurality of reinforcement members extending radially from a central position of the recessed portion and a plurality of rib members interconnecting the reinforcement members.

17. A spare tire receptacle for a vehicle comprising:
a receptacle body including a recessed portion and at least one side wall extending from the recessed portion, the side wall extending to a body portion;
a reinforcement structure attached to the receptacle body, the reinforcement structure including a plurality of reinforcement members extending radially from a central position of the recessed portion and a plurality of rib members interconnecting the reinforcement members wherein the reinforcement structure is mechanically attached to the receptacle body with a plurality of mechanical interlocks.

18. The spare tire receptacle of claim 17 wherein the recessed portion and body portion includes a plurality of apertures formed therein and attached to mechanical interlocks of the reinforcement structure.

19. The spare tire receptacle of claim 17 wherein the reinforcement members and rib members intersect at a junction providing a localized stiffness to the receptacle body mitigating vibration.

20. The spare tire receptacle of claim 17 wherein the receptacle body includes a monolithically formed cross car beam formed therein.

21. A spare tire receptacle for a vehicle comprising:
a receptacle body including a recessed portion and at least one side wall extending from the recessed portion, the side wall extending to a body portion;
a reinforcement structure attached to the receptacle body, the reinforcement structure including a plurality of reinforcement members extending radially from a central position of the recessed portion and a plurality of rib members interconnecting the reinforcement members wherein the reinforcement structure is over-molded onto the receptacle body.

22. The spare tire receptacle of claim 1 wherein the reinforcement structure is over-molded onto the receptacle body.

* * * * *